Patented May 11, 1954

2,678,311

UNITED STATES PATENT OFFICE 2,678,311

THEOPHYLLINE SALTS

Geza S. Delmar, Baie d'Urfe, Quebec, and Ernest Neil Macallum, Lachine, Quebec, Canada, assignors to Delmar Chemicals Limited, Lachine, Quebec, Canada, a corporation of Canada No Drawing. Application May 7, 1952, Serial No. 286,625

4 Claims. (Cl. 260—253)

The present invention relates to new xanthine salts which are water-soluble and particularly effective as therapeutic agents.

PRIOR ART

Xanthine derivatives are recognized to be drugs of useful diuretic, cardiac and muscular action. The most active among them is theophylline, which has been claimed also to be useful in the treatment of arterial hypertension.

In view of the slight solubility of theophylline in water, this compound is frequently used in the form of salts, for example, aminophylline (the ethylene diamine salt), glucophylline (the methylglycamine salt) or in the form of double salts, for example, theophylline sodium acetate, theophylline sodium glycinate. These salts have the advantage of being more soluble, but the portion of the products which is responsible for the increased solubility of theophylline, for example, ethylene diamine, methylglycamine, sodium acetate or glycine, have no pharmacological action of their own and their usefulness in these theophylline compounds does not extend so far as to improve or alter the pharmacologic action of the theophylline.

APPLICANTS' DEVELOPMENT

In accordance with the present invention there is now provided a new group of xanthine derivatives which are water-soluble and which possess increased pharmacological action. The new products correspond to the general formula

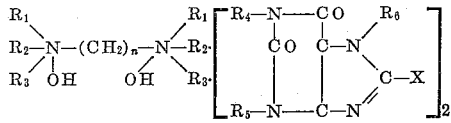

wherein $R_1$ and $R_2$ stand for a methyl radical, and $R_3$ stands for a methyl or ethyl radical, $n$ represents the numeral 6, $R_4$ and $R_5$ stand for methyl radical, $R_6$ stands for hydrogen, or —$CH_2COOH$ radicals and X for hydrogen chlorine or bromine.

The new products are readily soluble in water and combine the therapeutic action of both components used in making up the products. Of particular interest is the compound formed by reacting hexamethonium hydroxide with theophylline. The product obtained combines the hypotensive action of the first reactant with the diuretic, cardiac and muscular action of the theophylline. When compared with other known salts of theophylline it is found that this new salt possesses greatly increased utility.

As an example of the xanthine compounds which may be used there may be mentioned, theophylline, its halogenated derivatives, for example, 8-chloro-theophylline or 8-bromotheophylline, theophylline-7-acetic acid and other related compounds.

The quaternary bases used correspond to the formula

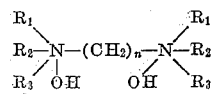

wherein $R_1$ and $R_2$ stand for a methyl radical, and $R_3$ stands for a methyl or ethyl radical, and $n$ represents the numeral 6. The preferred quaternary compounds are hexamethonium hydroxide (hexane-1,6-bis (trimethylammonium hydroxide)), pentamethonium hydroxide and decamethonium hydroxide.

The reaction may be carried out by reacting one mole of the quaternary ammonium hydroxide with two moles of an acidic xanthine derivative in the presence of or absence of water or a suitable organic solvent, for example, methanol, ethanol or isopropyl alcohol. The resulting salts may crystallize out, or they may be obtained by removing the solvent by distillation or evaporation at normal or reduced pressures.

EXAMPLES

The preparation of the products of the present invention will be more fully understood by referring to the following examples, but it is to be understood that they are not to be taken as limitative of the invention since equivalent procedures and variations in reactants may be used without departing from the spirit of the invention.

Example 1

23.6 gms. ($\frac{1}{10}$ mol) of hexane-1,6-bis-trimethylammonium hydroxide dissolved in methanol is mixed with a methanolic suspension of 36 gms. ($\frac{2}{10}$ mol) of anhydrous theophylline. A solution results. When the methanol is removed by distillation hexane-1,6-bis-trimethylammonium hydroxide-bis-theophyllinate is left behind as a white, slightly hygroscopic powder, which on analysis shows the expected results, consistent with the formula

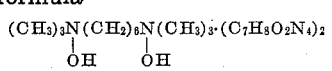

On the pentobarbitalized cat under artificial respiration 3 milligrams of hexane-1,6-bis-trimethylammonium hydroxide - bis - theophyllinate per kilogram weight of the animal was injected intravenously and produced a more intense depressor response than is usually obtained with the same dose of hexamethonium bromide. The subsequent response to an injection of 0.005 milligram of acetylcholine is not blocked but stimulation of the sympathetic chain in the neck no longer produces contraction of the nictitating membrane, nor pupillary dilatation.

Substituting in the above example hexane-1,6-bis (ethyl-dimethylammonium hydroxide) for the hexamethonium hydroxide, we obtain hexane-1,6-bis (ethyl-dimethylammonium hydroxide) bis-theophyllinate. Other bis-theophylline salts with the bases as per the general formula may be made the same way.

*Example 2*

Reacting a methanolic solution of 23.6 gm. hexamethonium hydroxide with a methanolic suspension of 42.8 gm. 8-chlorotheophylline and removing the solvent by distillation yields hexamethonium bis-8-chlorotheophyllinate.

Using instead of 8-chlorotheophylline molecular equivalents of 8-bromotheophylline yields hexamethonium bis-8-bromotheophyllinate.

Using molecular equivalents of other halogenated xanthine derivatives in the above example yields the corresponding hexamethonium bis-8-haloxanthinates.

Using molecular equivalents of other quaternary bases as per the general formula, the corresponding bis-haloxanthinates are obtained.

*Example 3*

Reacting a methanolic solution of 23.6 gm. hexamethonium hydroxide with a methanolic suspension of 47.6 gm. theophylline-7-acetic acid and removing the solvent by distillation yields hexamethonium-bis-theophylline-7-acetate.

Using molecular equivalents of other quaternary bases in this example as per the general formula, the corresponding bis-theophylline-7-acetates are obtained.

We claim:

1. As a new compound, hexane-1,6-bis-trimethylammonium hydroxide bis-theophyllinate corresponding to the formula

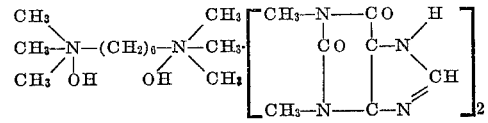

2. As new compounds, the xanthine salts corresponding to the general formula

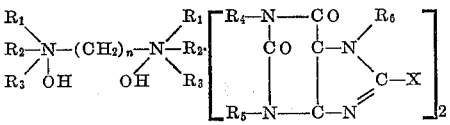

wherein $R_1$, $R_2$, $R_4$ and $R_5$ stand for a methyl radical, $R_3$ is a radical selected from the group consisting of methyl and ethyl radicals and $R_6$ stands for a radical selected from the group consisting of hydrogen and $-CH_2CO_2H$ and X stands for a radical selected from the group consisting of hydrogen, chlorine and bromine.

3. A process for preparing xanthine salts corresponding to the general formula

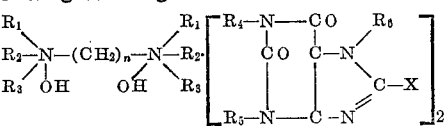

wherein $R_1$, $R_2$, $R_4$ and $R_5$ stand for a methyl radical, $R_3$ is a radical selected from the group consisting of methyl and ethyl radicals and $R_6$ stands for a radical selected from the group consisting of hydrogen and $-CH_2CO_2H$ and X stands for a radical selected from the group consisting of hydrogen, chlorine and bromine, comprising reacting a quaternary base of the formula

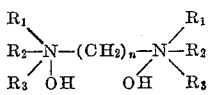

with a xanthine compound of the formula

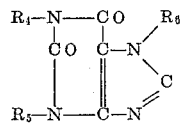

and recovering the desired xanthine derivative from the reaction mixture.

4. A process for the preparation of hexane-1,6-bis-trimethylammonium hydroxide bis-theophyllinate comprising reacting one mol of hexane-1,6-bis-trimethylammonium hydroxide with two mols of theophylline and recovering the desired reaction product.

No references cited.